United States Patent
Choi et al.

(10) Patent No.: US 12,156,042 B2
(45) Date of Patent: Nov. 26, 2024

(54) METHOD AND DEVICE FOR MANAGING BEAM IN SIDELINK COMMUNICATION

(71) Applicants: Hyundai Motor Company, Seoul (KR); Kia Corporation, Seoul (KR)

(72) Inventors: Su Han Choi, Gyeonggi-do (KR); Gene Back Hahn, Gyeonggi-do (KR); In Yong Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 470 days.

(21) Appl. No.: 17/430,247

(22) PCT Filed: Feb. 14, 2020

(86) PCT No.: PCT/KR2020/002126
§ 371 (c)(1),
(2) Date: Aug. 11, 2021

(87) PCT Pub. No.: WO2020/167038
PCT Pub. Date: Aug. 20, 2020

(65) Prior Publication Data
US 2022/0167180 A1    May 26, 2022

Related U.S. Application Data
(60) Provisional application No. 62/806,272, filed on Feb. 15, 2019.

(51) Int. Cl.
*H04W 16/28* (2009.01)
*H04W 24/10* (2009.01)
(Continued)

(52) U.S. Cl.
CPC ......... *H04W 16/28* (2013.01); *H04W 24/10* (2013.01); *H04W 56/001* (2013.01); *H04W 92/18* (2013.01)

(58) Field of Classification Search
CPC ... H04W 16/28; H04W 24/10; H04W 56/001; H04W 92/18; H04W 8/005;
(Continued)

(56) References Cited

U.S. PATENT DOCUMENTS

2013/0301454 A1* 11/2013 Seol .................. H04B 7/0695
370/252
2016/0142117 A1* 5/2016 Rahman .............. H04B 7/0486
375/267

(Continued)

FOREIGN PATENT DOCUMENTS

| KR | 2018-0016301 A | 2/2018 |
|---|---|---|
| WO | 2018/129300 A1 | 7/2018 |

OTHER PUBLICATIONS

3GPP TSG RAN WG1 Ad-Hoc Meeting 1901, R1-1900862, Taipei, Jan. 21-25, 2019; Title:Beamforming for V2X sidelink for FR1 and FR2; AgendaItem:7.2.4.1.5;Source:Huawei, HiSilicon; Document for: Discussion and Decision.
(Continued)

*Primary Examiner* — Jay P Patel
*Assistant Examiner* — Shehab A Alawdi
(74) *Attorney, Agent, or Firm* — Fox Rothschild LLP

(57) ABSTRACT

Disclosed are a method and a device for managing a beam in sidelink communication. An operation method of a first terminal comprises: a step for transmitting a first sidelink signal in all directions using a beam sweeping method in an initial beam management section; a step for receiving, from a second terminal, first feedback information for the first sidelink signal; a step for setting a first beam pair between the first terminal and the second terminal on the basis of the first feedback information; a step for performing sidelink communication with the second terminal using the first beam pair; and a step for, when it is necessary to reset the first beam pair, transmitting the second sidelink signal in a
(Continued)

specific direction instead of all the directions using the beam sweeping method in a partial beam management section. Therefore, the performance of a communication system can be improved.

19 Claims, 15 Drawing Sheets

(51) Int. Cl.
  *H04W 56/00* (2009.01)
  *H04W 92/18* (2009.01)
(58) Field of Classification Search
  CPC .......................... H04B 7/0621; H04B 7/0695; H04B 7/06954; H04B 7/088; H04B 7/0408; H04B 7/0617; H04B 7/0619; H04B 7/0623; H04L 1/0026; H04L 1/0031; H04L 1/1671
  See application file for complete search history.

(56) References Cited

U.S. PATENT DOCUMENTS

| | | | | |
|---|---|---|---|---|
| 2016/0204507 A1* | 7/2016 | Karjalainen | ......... | H04W 84/20 342/372 |
| 2016/0323029 A1* | 11/2016 | Cheng | ................ | H04B 7/0626 |
| 2018/0084440 A1* | 3/2018 | Nagaraja | ............... | H04W 16/28 |
| 2018/0102826 A1 | 4/2018 | Raghavan et al. | | |
| 2018/0220345 A1* | 8/2018 | Moon | ................... | H04W 36/24 |
| 2019/0037426 A1 | 1/2019 | Yu et al. | | |
| 2019/0044667 A1* | 2/2019 | Guo | ...................... | H04L 1/1822 |
| 2019/0173533 A1 | 6/2019 | Kim et al. | | |
| 2019/0182816 A1* | 6/2019 | Choe | ..................... | H04L 1/0003 |
| 2019/0238287 A1* | 8/2019 | Zhou | .................... | H04B 7/0626 |
| 2019/0319691 A1* | 10/2019 | Song | ................... | H04B 7/0695 |
| 2019/0372647 A1* | 12/2019 | Su | ...................... | H04B 7/06954 |
| 2020/0021946 A1* | 1/2020 | Kumar | ................. | G01S 1/0428 |
| 2020/0077285 A1* | 3/2020 | Yu | ......................... | H04W 72/12 |
| 2021/0219268 A1* | 7/2021 | Li | ......................... | H04W 72/20 |

OTHER PUBLICATIONS

Giordani, M., "A Tutorial on Beam Management for 3GPP NR at mmWave Frequencies", IEE Communications Surveys & Tutorials, vol. 21, No. 1, First Quarter 2019, 24 pages.

R1-1900862, "Beamforming for V2X sidelink for FR1 and FR2", 3GPP TSG RAN WG1 Ad-Hoc Meeting 1901, Taipei, Jan. 21-25, 2019, Agenda Item 7.2.4.1.5, Huawei, HiSilicon, 5 pages.

R2-1703712, "NR beam recovery procedure", 3GPP TSG-RAN WG2 2017 RAN2#97bis Meeting, Spokane, USA, Apr. 3-7, 2017, Agendan Item 10.2.3.4, Samsung, 6 pages.

* cited by examiner

METHOD AND DEVICE FOR MANAGING BEAM IN SIDELINK COMMUNICATION

CROSS-REFERENCE TO RELATED APPLICATIONS

This application is a National Phase application filed under 35 USC 371 of PCT International Application No. PCT/KR2020/002126 with an International Filing Date of Feb. 14, 2020, which claims the benefit of U.S. Provisional Application 62/806,272 filed on Feb. 15, 2019. The entire contents of these applications are incorporated herein by reference in their entirety.

TECHNICAL FIELD

The present disclosure relates to a sidelink communication technique, and more specifically, to a beam management technique for configuring a beam pair between a transmitting terminal and a receiving terminal participating in sidelink communication.

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

Meanwhile, sidelink communication may be performed using a high frequency band (e.g., millimeter wave band). The frequency band used for sidelink communication may be referred to as a 'frequency range (FR) 2'. In particular, sidelink communication may be performed in a beam sweeping scheme. Accordingly, a transmitting terminal may transmit sidelink signals and/or channels in all directions by rotating a beam. For example, a transmitting terminal and a receiving terminal may perform a beam management procedure using the beam sweeping scheme. The beam management procedure may be performed using sidelink signals and/or channels transmitted in all directions. A beam pair between the transmitting terminal and the receiving terminal may be configured by the beam management procedure. The beam pair may refer to a pair between a transmission beam of the transmitting terminal and a reception beam of the receiving terminal, and the reception beam of the receiving terminal may be a receiving direction.

After the beam management procedure (e.g., initial beam management procedure) is completed, the transmitting terminal and the receiving terminal may perform sidelink communication using the beam pair. Due to a movement of the transmitting terminal, a movement of the receiving terminal, and/or a change in a channel state between the transmitting terminal and the receiving terminal, a beam failure may be declared during sidelink communication. In particular, the transmitting terminal and the receiving terminal may perform the beam management procedure (e.g., additional beam management procedure) again. The additional beam management procedure may be a beam failure recovery (BFR) procedure. Since the additional beam management procedure is performed using sidelink signals and/or channels transmitted in all directions without consideration of the beam pair configured in the initial beam management procedure, a substantial amount of time may be required to reconfigure a beam pair.

SUMMARY

An objective of the present disclosure for solving the above-described problem is to provide a method and an apparatus for configuring a beam pair between a transmitting terminal and a receiving terminal in sidelink communication.

An operation method of a first terminal, according to a first exemplary embodiment of the present disclosure for achieving the objective, may include: transmitting first sidelink signals in all directions using a beam sweeping scheme in an initial beam management period; receiving first feedback information for the first sidelink signals from a second terminal; configuring a first beam pair between the first terminal and the second terminal based on the first feedback information; performing sidelink communication with the second terminal using the first beam pair; and in response to determining that reconfiguration of the first beam pair is required, transmitting second sidelink signals in a specific direction instead of all directions using a beam sweeping scheme in a partial beam management period.

The operation method may further include: receiving second feedback information for the second sidelink signals from the second terminal; configuring a second beam pair between the first terminal and the second terminal based on the second feedback information; and performing the sidelink communication with the second terminal using the second beam pair. The operation method may further include transmitting third sidelink signals in all directions using a beam sweeping scheme when the first beam pair is not reconfigured within the partial beam management period.

An initial beam management procedure may be performed within the initial beam management period, a partial beam management procedure may be performed within the partial beam management period, and configuration information for the initial beam management procedure and configuration information for the partial beam management procedure may be received from a base station.

When a beam failure is declared between the first terminal and the second terminal, a partial beam management procedure may be performed within the partial beam management period, and the beam failure may be declared based on at least one of a hybrid automatic repeat request (HARQ) response and beam measurement information received from the second terminal.

The specific direction may be a direction of transmitting beams belonging to a beam area, and the beams belonging to the beam area may be determined based on a transmission beam of the first terminal in the first beam pair. The beams belonging to the beam area may include the transmission beam and n beams adjacent to the transmission beam, and n may be a natural number. The number of the beams belonging to the beam area may be configured by the base station. A center beam among the beams belonging to the beam area may be a beam spaced apart from the transmission beam by m, and m may be a natural number. Additionally, m may be determined based on a speed of the second terminal, and a separation direction from the transmission beam to the center beam may be determined based on a movement direction of the second terminal.

A partial beam management procedure may be repeatedly performed within the partial beam management period, and a first beam area corresponding to a specific direction in which the second sidelink signals are transmitted in a first partial beam management procedure may be different from a second beam area corresponding to a specific direction in which the second sidelink signals are transmitted in a second partial beam management procedure after the first partial beam management procedure. The second beam area may be greater than the first beam area, or the second beam area may be shifted relative to the first beam area. Each of the first sidelink signal and the second sidelink signal may be a synchronization signal or a reference signal.

An operation method of a second terminal, according to a second exemplary embodiment of the present disclosure for achieving the objective, may include: receiving first sidelink signals from a first terminal in an initial beam management period; transmitting first feedback information for the first sidelink signals to the first terminal; performing sidelink communication with the first terminal using a first beam pair between the first terminal and the second terminal, the first beam pair being determined based on the first feedback information; and in response to determining that reconfiguration of the first beam pair is required, receiving second sidelink signals from the first terminal in a partial beam management period, wherein the first sidelink signals are transmitted in all directions in the initial beam management period, and the second sidelink signals are transmitted in a specific direction instead of all directions in the partial beam management period.

The operation method may further include: transmitting second feedback information for the second sidelink signals to the first terminal; and performing the sidelink communication with the first terminal using a second beam pair between the first terminal and the second terminal, the second beam pair being determined based on the second feedback information. The specific direction may be a direction of transmitting beams belonging to a beam area, and the beams belonging to the beam area may be determined based on a transmission beam of the first terminal in the first beam pair.

The beams belonging to the beam area may include the transmission beam and n beams adjacent to the transmission beam, and n may be a natural number. A center beam among the beams belonging to the beam area may be a beam spaced apart from the transmission beam by m, and m may be a natural number.

A partial beam management procedure may be repeatedly performed within the partial beam management period, and a first beam area corresponding to a specific direction in which the second sidelink signals are transmitted in a first partial beam management procedure may be different from a second beam area corresponding to a specific direction in which the second sidelink signals are transmitted in a second partial beam management procedure after the first partial beam management procedure.

The second beam area may be greater than the first beam area, or the second beam area may be shifted relative to the first beam area.

According to the exemplary embodiments of the present disclosure, in an initial beam management procedure, a transmitting terminal may transmit synchronization signals in all directions, and a beam pair between the transmitting terminal and a receiving terminal may be configured based on reception qualities of the synchronization signals. The beam pair may include a transmission beam of the transmitting terminal and a reception beam (e.g., receiving direction) of the receiving terminal. Sidelink communication between the transmitting terminal and the receiving terminal may be performed using the beam pair configured in the initial beam management procedure.

During execution of the sidelink communication, reconfiguration of the beam pair may be required according to a movement of the transmitting terminal, a movement of the receiving terminal, and/or a change in a channel state between the transmitting terminal and the receiving terminal. In particular, a partial beam management procedure may be performed. In the partial beam management procedure, the transmitting terminal may transmit synchronization signals in a specific direction instead of all directions, and a beam pair between the transmitting terminal and the receiving terminal may be configured based on reception qualities of the synchronization signals. In the partial beam management procedure, the synchronization signals may be transmitted through some beams instead of all beams (e.g., beams used in the initial beam management procedure).

Accordingly, a transmission overhead of the synchronization signals in the transmitting terminal may be reduced, an operation complexity in the receiving terminal may be reduced, and the partial beam management procedure may be performed rapidly. In other words, the performance of the communication system may be improved.

DETAILED DESCRIPTION

Figure 1:
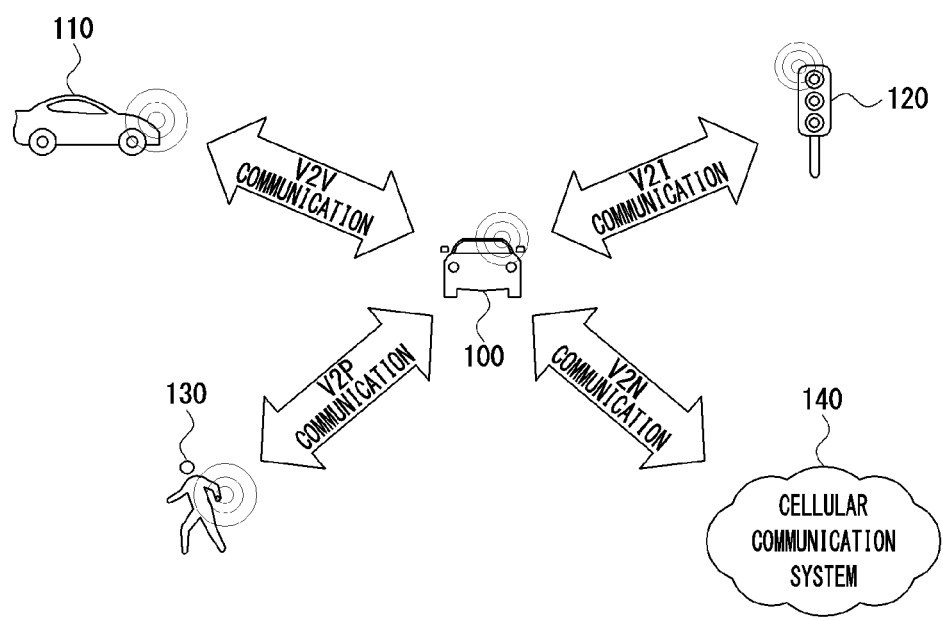
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located in the vehicle 100 or the communication node carried by the person 130 may generate an alarm indicating a danger by determining a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
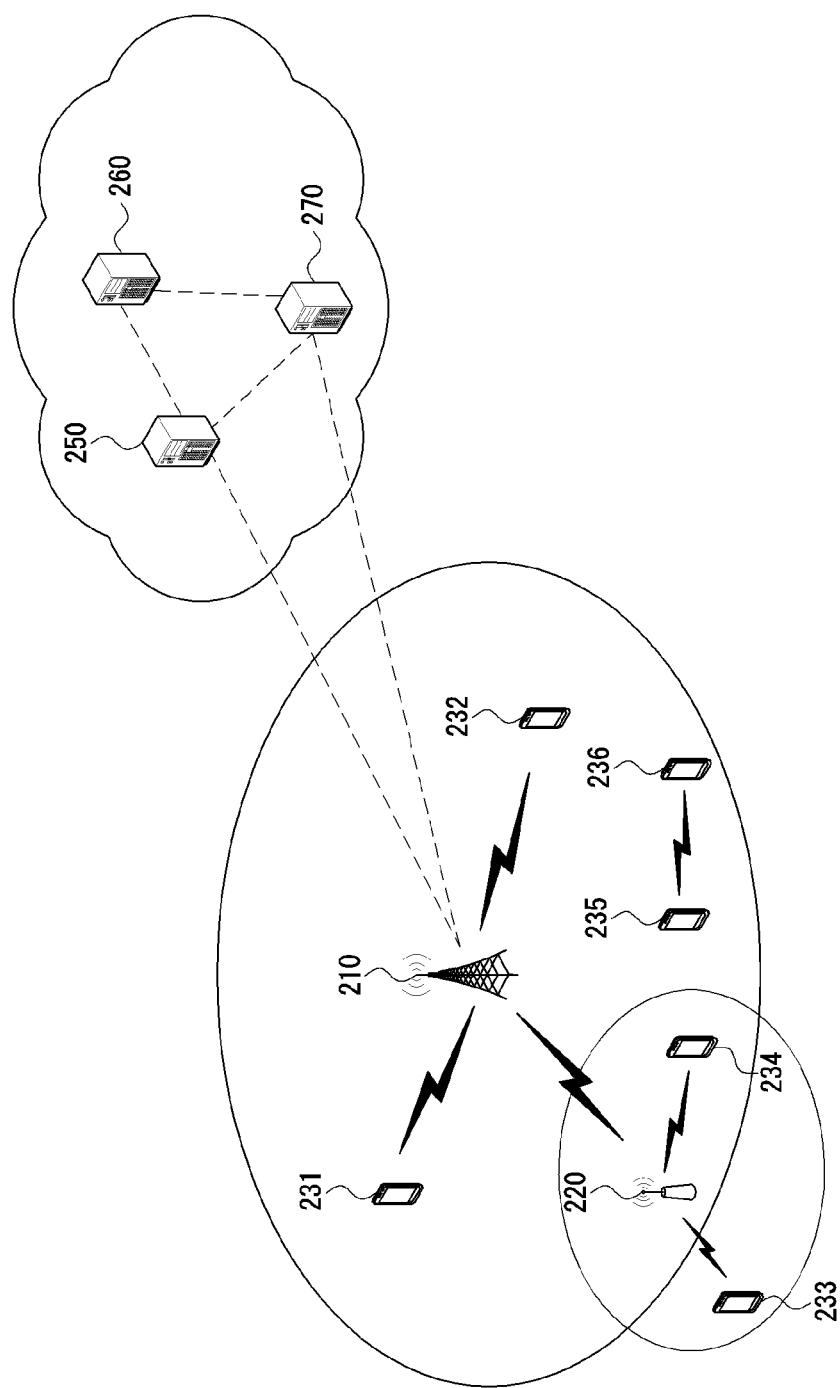
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported via the V2X network slice configured in the core network.

The communication nodes (e.g., base station, relay, UE, S-GW, P-GW, MME, UPF, SMF, AMF, etc.) including the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
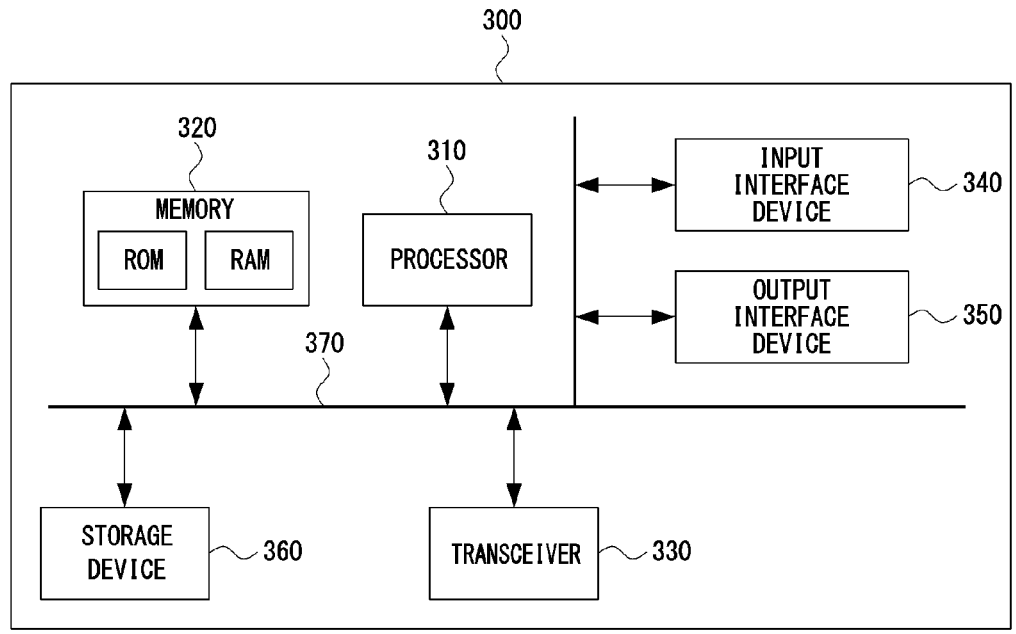
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may include at least one processor 310, a memory 320, and a transceiver 330 connected to a network for performing communications. In addition, the communication node 300 may further include an input interface device 340, an output interface device 350, a storage device 360, and the like. Each component included in the communication node 300 may communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. In other words, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

In particular, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
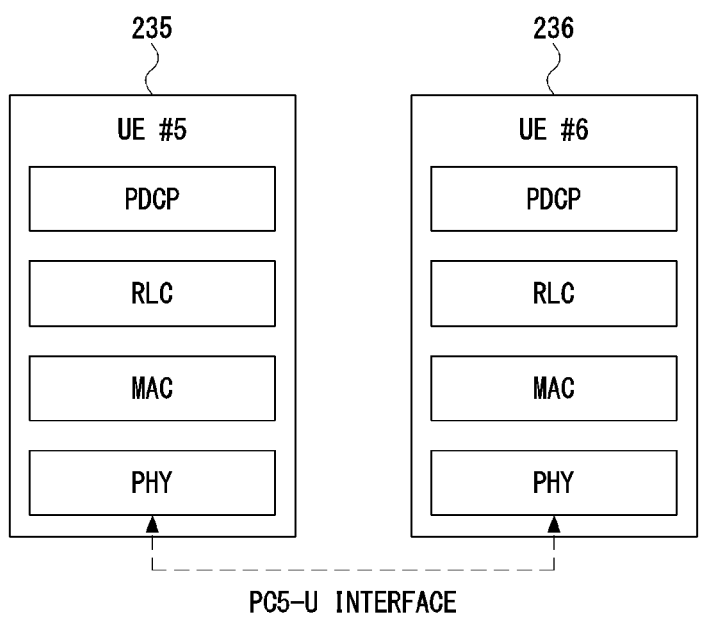
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). In addition, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
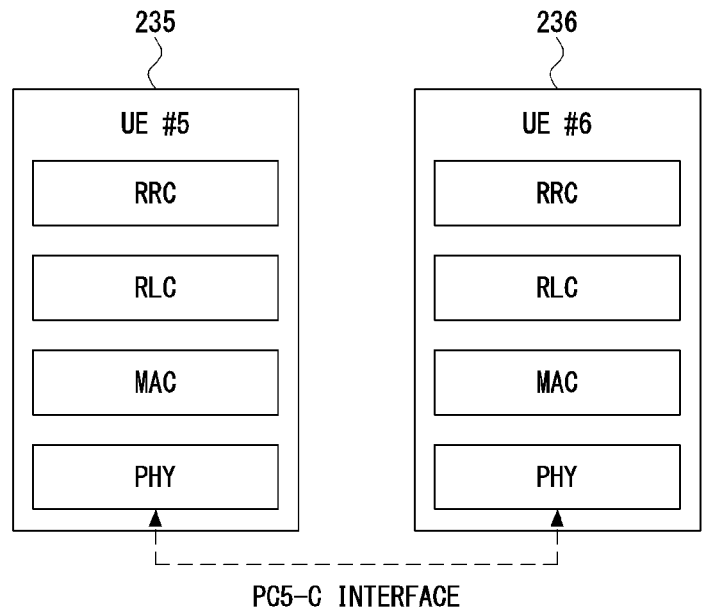
FIG. 5 is a block diagram illustrating a first exemplary embodiment of a control plane protocol stack of a UE performing sidelink communication.
Figure 6:
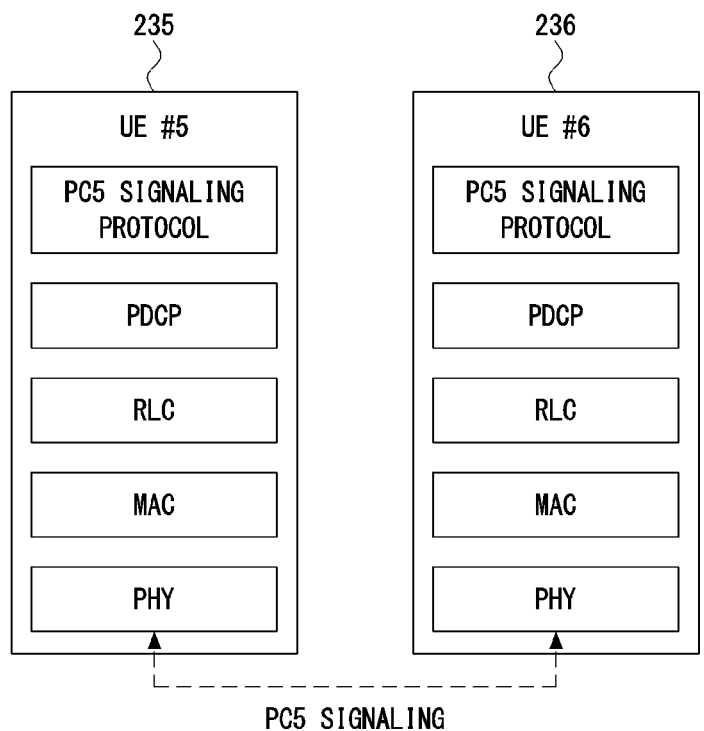
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). In addition, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In particular, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. Particularly, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, beam management methods in sidelink communication will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. In other words, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

Sidelink communication may be performed using a high frequency band (e.g., millimeter wave band). In particular, sidelink communication may be performed in the beam sweeping scheme. Accordingly, a transmitting terminal (e.g., transmitting UE) may transmit sidelink signals and/or channels in all directions by rotating a beam. The sidelink signal may be a synchronization signal and a reference signal used for sidelink communication.

For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

A beam management procedure may be performed for sidelink communication between a transmitting terminal and a receiving terminal (e.g., receiving UE). A beam pair between the transmitting terminal and the receiving terminal may be configured by the beam management procedure. The beam pair may be a pair between a transmission beam of the transmitting terminal and a reception beam of the receiving terminal. In other words, the beam pair may include a transmission beam of the transmitting terminal and a reception beam of the receiving terminal. The reception beam may refer to a receiving direction of the receiving terminal. The transmitting terminal and the receiving terminal may perform sidelink communication using the beam pair configured by the beam management procedure. In sidelink communication, the beam management procedure may be performed as follows.

Figure 7:
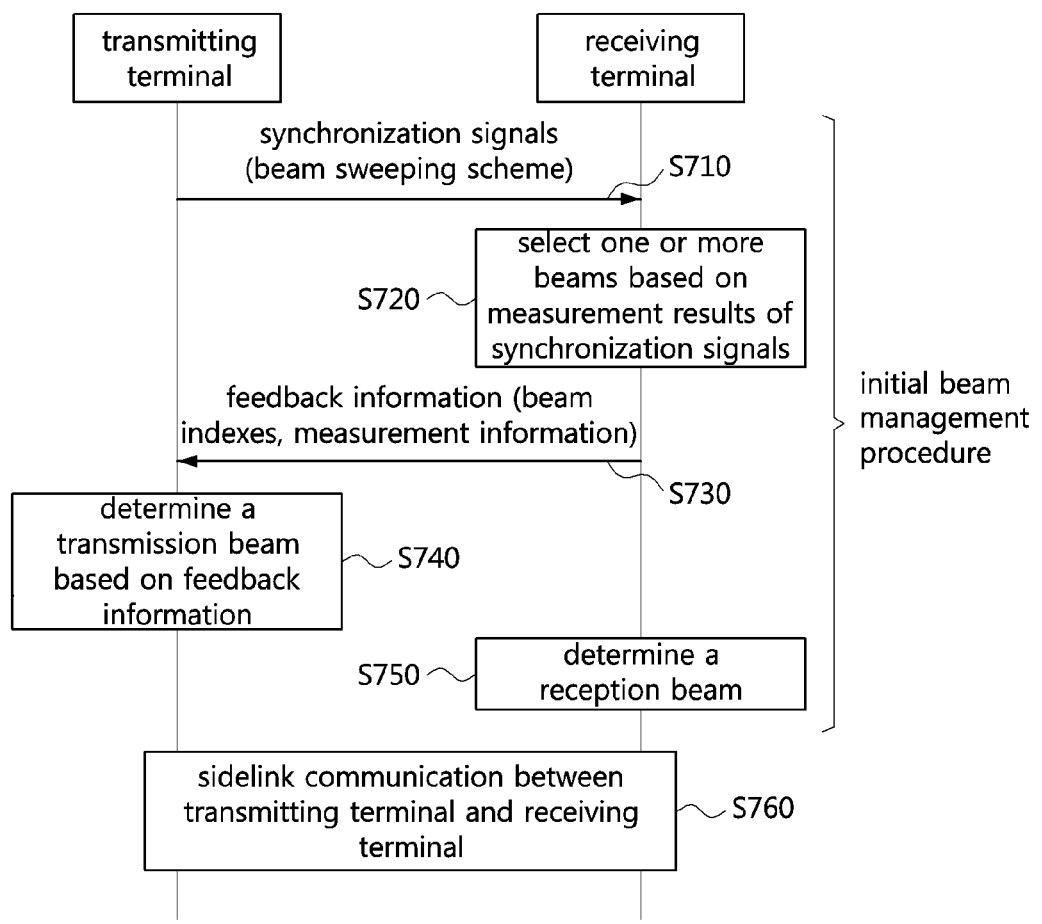
FIG. 7 is a sequence chart illustrating a first exemplary embodiment of a beam management method in a communication system.

FIG. 7 is a sequence chart illustrating a first exemplary embodiment of a beam management method in a communication system.

As shown in FIG. 7, the communication system may include a base station (not shown), a transmitting terminal, a receiving terminal, and the like. Each of the transmitting terminal and the receiving terminal may be located within a coverage of the base station, and may operate in an RRC idle state, RRC connected state, or RRC inactive state. Alternatively, each of the transmitting terminal and the receiving terminal may be located outside the coverage of the base station. The transmitting terminal may be the UE #5 235 shown in FIG. 2, and the receiving terminal may be the UE #6 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

Each of the transmitting terminal and the receiving terminal may receive configuration information for sidelink communication (hereinafter, 'sidelink configuration information') from the base station. The sidelink configuration information may be transmitted through a combination of one or more of an RRC message, a MAC control element (CE), and control information (e.g., downlink control information (DCI), uplink control information (UCI)). The sidelink configuration information may include configuration information for an initial beam management procedure (hereinafter referred to as 'initial beam management configuration information'), configuration information for a partial beam management procedure (hereinafter, 'partial beam management configuration information'), and/or the like. Each of the transmitting terminal and the receiving terminal may receive the sidelink configuration information (e.g., initial beam management configuration information and/or partial beam management configuration information) from the base station.

Alternatively, the sidelink configuration information may include the initial beam management configuration information, and the partial beam management configuration information may be transmitted in response to determining that reconfiguration of a beam pair configured by the initial beam management procedure is required. In particular, the base station may transmit the partial beam management configuration information to each of the transmitting terminal and the receiving terminal. Alternatively, the transmitting terminal may generate partial beam management configuration information, and transmit the generated partial beam management configuration information to the receiving terminal.

The initial beam management procedure may refer to a beam management procedure performed initially between the transmitting terminal and the receiving terminal. In other words, the transmitting terminal and the receiving terminal may configure a beam pair by performing the initial beam management procedure to perform sidelink communication. The sidelink communication between the transmitting terminal and the receiving terminal may be performed by the beam pair configured by the initial beam management procedure. Due to a movement of the transmitting terminal, a movement of the receiving terminal, and/or a change in a channel state between the transmitting terminal and the receiving terminal while performing the sidelink communication, the beam pair configured by the initial beam management procedure may be not suitable for the sidelink communication between the transmitting terminal and the receiving terminal.

Particularly, a partial beam management procedure may be performed to reconfigure a beam pair between the transmitting terminal and the receiving terminal. The partial beam management procedure may be referred to as an 'intermediate beam management procedure', 'reduced beam management procedure', or 'additional beam management procedure'. In addition, the partial beam management procedure may be performed when a beam failure is detected or declared. In particular, the partial beam management procedure may refer to a beam failure recovery (BFR) procedure. The initial beam management procedure may be performed using sidelink signals and/or channels transmitted in all directions, and the partial beam management procedure may be performed using sidelink signals and/or channels transmitted in a specific direction instead of all directions.

The initial beam management configuration information may include one or more information elements among information elements described in Table 3 below.

TABLE 3

| Information elements | Description |
| --- | --- |
| Time period information | Time period in which the initial beam management procedure is performed |
| | Periodicity of the time period in which the initial beam management procedure is performed |
| Frequency band information | Frequency band in which the initial beam management procedure is performed |
| Repetition number information | Repetition number of the initial beam management procedure (e.g., maximum repetition number) |
| Beam configuration information | The number of beams used in the initial beam management procedure (e.g., maximum number of beams) |
| | A beam width used in the initial beam management procedure (e.g., maximum width of a beam) |
| Feedback configuration information | Threshold used for selecting an optimal beam in the initial beam management procedure (e.g., threshold of a reception signal quality) |
| | Number of beams reported from the receiving terminal to the transmitting terminal in the initial beam management procedure (e.g., maximum number of beams) |
| | Resources (e.g., PSSCH, PSFCH) used for transmission of feedback information (e.g., beam index, beam measurement information (e.g., CSI, CQI, RSRP, RSRQ, SNR, SINR, etc.)) in the initial beam management procedure |

The partial beam management configuration information may include one or more information elements among information elements described in Table 4 below. The maximum number of beams used in the partial beam management procedure may be less than the maximum number of beams used in the initial beam management procedure. The maximum number of beams used in the partial beam management procedure may be set to a specific value, and the number of repetitions of the partial beam management procedure may be dynamically set according to the maximum number of beams used in the partial beam management procedure.

TABLE 4

| Information elements | Description |
| --- | --- |
| Time period information | Time period in which the partial beam management procedure is performed<br>Periodicity of the time period in which the partial beam management procedure is performed |
| Frequency band information | Frequency band in which the partial beam management procedure is performed |
| Repetition number information | Repetition number of the partial beam management procedure (e.g., maximum repetition number) |
| Beam configuration information | The number of beams used in the partial beam management procedure (e.g., maximum number of beams)<br>A beam width used in the partial beam management procedure (e.g., maximum width of a beam)<br>Information of beam(s) used in the partial beam management procedure (e.g., beam index(es), beam range, beam offset, a difference of beam areas) |
| Feedback configuration information | Threshold used for selecting an optimal beam in the partial beam management procedure (e.g., threshold of a reception signal quality)<br>Number of beams reported from the receiving terminal to the transmitting terminal in the partial beam management procedure (e.g., maximum number of beams)<br>Resources (e.g., PSSCH, PSFCH) used for transmission of feedback information (e.g., beam index, beam measurement information (e.g., CSI, CQI, RSRP, RSRQ, SNR, SINR, etc.)) in the partial beam management procedure |

Meanwhile, the initial beam management procedure between the transmitting terminal and the receiving terminal may be performed based on the initial beam management configuration information. For example, the transmitting terminal may transmit synchronization signals in the beam sweeping scheme (S710). The synchronization signals may be transmitted using radio resources (e.g., time period, frequency band) indicated by the initial beam management configuration information, and the initial beam management procedure may be repeatedly performed as many time as the number of repetitions indicated by the initial beam management configuration information. In the step S710, other sidelink signals and/or channels may be used instead of the synchronization signals. In the step S710, the synchronization signals may be transmitted in all directions, and information required for sidelink communication as well as the synchronization signals may be transmitted.

The receiving terminal may receive the synchronization signals by performing a monitoring operation on the radio resources (e.g., time period, frequency band) indicated by the initial beam management configuration information. The receiving terminal may measure reception strengths of the synchronization signals, and select one or more beams (e.g., transmission beams of the transmitting terminal) through which one or more synchronization signals having a good reception strength (e.g., reception quality) are received (S720). For example, the receiving terminal may select beams associated with synchronization signals having a reception strength equal to or greater than a threshold (e.g., threshold indicated by the initial beam management configuration information). The number of beams selected in the step S720 may be indicated by the initial beam management configuration information. In addition, the receiving terminal may identify a beam index associated with the synchronization signal based on a resource in which the synchronization signal is received and/or information included in the synchronization signal.

The receiving terminal may generate feedback information including index(es) of one or more beams selected in the step S720. The feedback information may include not only the beam index(es), but also measurement information (e.g., channel state information (CSI), channel quality indicator (CQI), reference signal received power (RSRP), reference signal received quality (RSRQ), signal to noise ratio (SNR), and/or signal to interference plus noise ratio (SINR)) of the synchronization signal(s) received through the corresponding beam(s). The receiving terminal may transmit the feedback information to the transmitting terminal (S730). The feedback information may be transmitted using radio resources indicated by the initial beam management configuration information.

The transmitting terminal may receive the feedback information (e.g., beam index(es) and/or measurement information) from the receiving terminal by performing a monitoring operation on feedback resources indicated by the initial beam management configuration information. The transmitting terminal may determine a final transmission beam of the transmitting terminal based on the feedback information (S740). For example, when the feedback information includes one beam index (e.g., an index of a beam associated with a synchronization signal having the best reception quality), the transmitting terminal may determine a beam corresponding to the beam index included in the feedback information as the final transmission beam of the transmitting terminal. When the feedback information includes a plurality of beam indexes, the transmitting terminal may determine a beam having the best reception quality (e.g., received signal strength) among a plurality of beams corresponding to the plurality of beam indexes as the final transmission beam of the transmitting terminal. The transmitting terminal may inform the receiving terminal of information (e.g., beam index) of the final transmission beam.

In addition, the receiving terminal may determine a reception beam (e.g., receiving direction) of the receiving terminal by using sidelink signals and/or channels received from the transmitting terminal (S750). The receiving terminal may inform the transmitting terminal of the reception beam determined in the step S750. A beam pair (e.g., transmission beam-reception beam) may be configured between the transmitting terminal and the receiving terminal by the initial beam management procedure (e.g., steps S710 to S750). The initial beam management procedure (e.g., steps S710 to S750) may be repeatedly performed. For example, when a beam pair between the transmitting terminal and the receiving terminal is not configured in a first initial beam management procedure, a second initial beam management procedure may be performed after the first initial beam management procedure. The initial beam management procedure may be repeatedly performed as many times as the number of repetitions configured by the base station. The sidelink communication between the transmitting terminal and the receiving terminal may be performed using the beam pair configured by the initial beam management procedure (S760). The above-described initial beam management procedure may be performed as follows.

Figure 8:
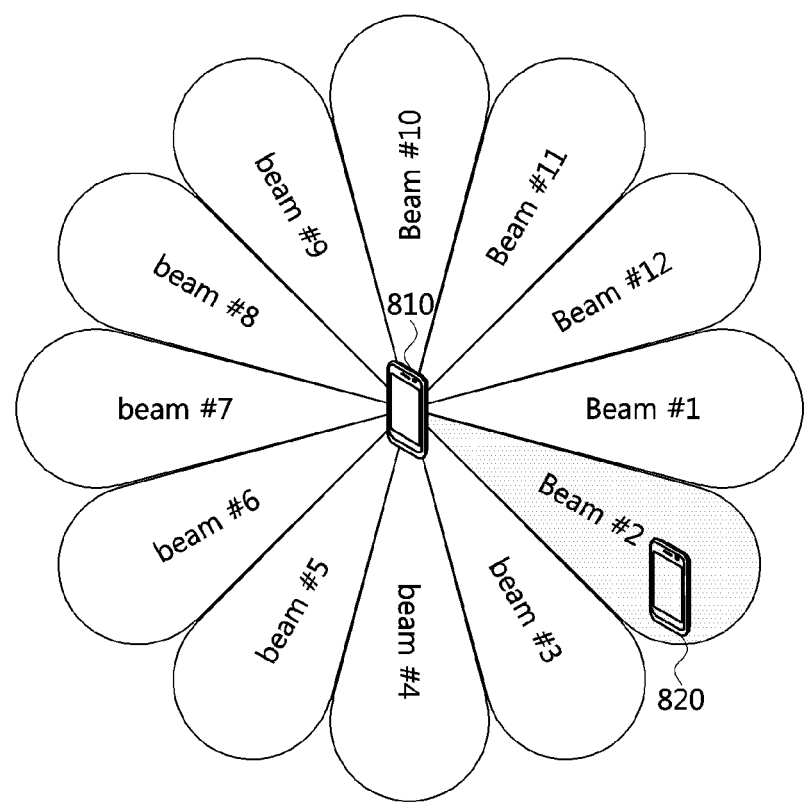
FIG. 8 is a conceptual diagram illustrating a first exemplary embodiment of an initial beam management procedure in a communication system.

FIG. 8 is a conceptual diagram illustrating a first exemplary embodiment of an initial beam management procedure in a communication system.

As shown in FIG. 8, a transmitting terminal 810 may be the transmitting terminal shown in FIG. 7, and a receiving terminal 820 may be the receiving terminal shown in FIG. 7. The transmitting terminal 810 may transmit synchronization signals in the beam sweeping scheme using 12 beams (e.g., beams #1 to #12). Therefore, the synchronization signals may be transmitted in all directions. The receiving terminal 820 may receive one or more synchronization signals from the transmitting terminal 810. When the receiving terminal 820 is located in an area corresponding to the beam #2 of the transmitting terminal 810, a synchronization signal having the best quality among the synchronization signals received from the receiving terminal 820 may be a synchronization signal transmitted through the beam #2. In particular, the receiving terminal 820 may transmit feedback information indicating the beam #2 to the transmitting terminal 810. When the feedback information is received from the receiving terminal 820, the transmitting terminal 810 may determine the beam #2 indicated by the feedback information as a final transmission beam of the transmitting terminal 810.

Alternatively, the receiving terminal 820 may report feedback information including a plurality of beam indexes to the transmitting terminal 810. Particularly, the receiving terminal 820 may transmit feedback information including indexes of beams (e.g., beams #1 to #3 or beams #1 to #4) having a reception quality equal to or greater than a threshold to the transmitting terminal 810. In particular, the feedback information may further include reception quality information of the synchronization signal(s) associated with the corresponding beam(s). When the feedback information is received from the receiving terminal 820, the transmitting terminal 810 may determine the beam #2 having the best quality among the beams indicated by the feedback information as the final transmission beam of the transmitting terminal 810. In the following exemplary embodiments, it may be assumed that the transmission beam configured by the initial beam management procedure is the beam #2.

Meanwhile, the step S760 (i.e., sidelink communication between the transmitting terminal and the receiving terminal) may be performed as follows.

Figure 9:
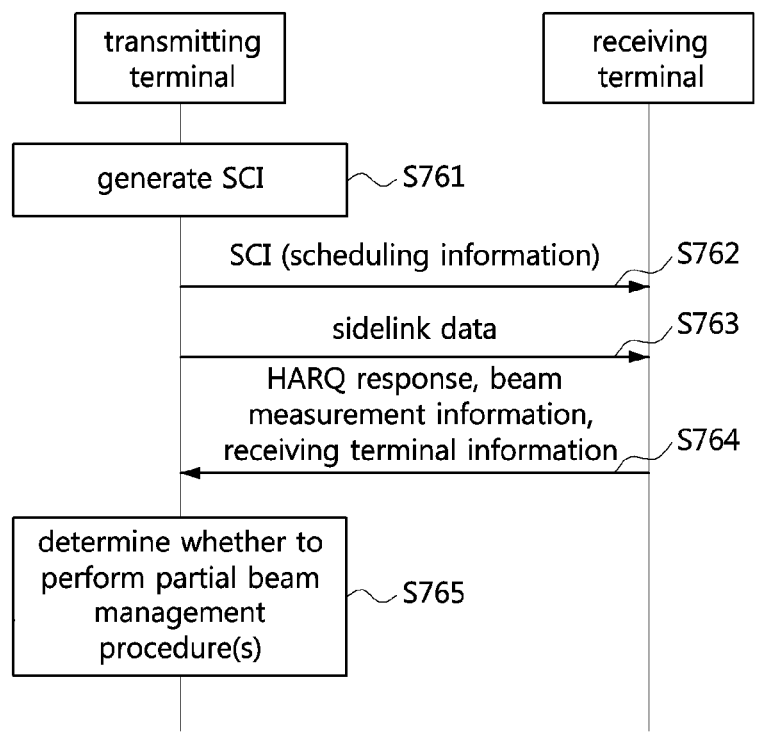
FIG. 9 is a sequence chart illustrating a first exemplary embodiment of a sidelink communication method in a communication system.

FIG. 9 is a sequence chart illustrating a first exemplary embodiment of a sidelink communication method in a communication system.

As shown in FIG. 9, when sidelink data to be transmitted to the receiving terminal is present, the transmitting terminal may generate SCI including scheduling information of the sidelink data (S761). The transmitting terminal may transmit the SCI to the receiving terminal by using the transmission beam (e.g., beam #2) determined in the initial beam management procedure (S762). The receiving terminal may receive the SCI from the transmitting terminal by performing a monitoring operation in the receiving direction determined in the initial beam management procedure, and may identify the scheduling information included in the SCI.

The transmitting terminal may transmit the sidelink data to the receiving terminal by using radio resources (e.g., PSSCH) indicated by the SCI (S763). The receiving terminal may receive the sidelink data from the transmitting terminal by performing a monitoring operation on the radio resources (e.g., PSSCH) indicated by the SCI. The receiving terminal may transmit a HARQ response (e.g., acknowledgment (ACK) or negative ACK (HACK)) for the sidelink data to the transmitting terminal (S764).

In addition, in the sidelink communication, the transmitting terminal may periodically transmit sidelink signals and/or channels for beam measurement. For example, reference signals used for beam measurement may be included in the PSSCH of the step S763. The receiving terminal may perform a beam measurement procedure based on sidelink signals and/or channels received from the transmitting terminal. The beam measurement procedure may be performed on the beam (e.g., beam #2) configured by the initial beam configuration procedure.

The receiving terminal may transmit beam measurement information (e.g., CSI, CQI, RSRP, RSRQ, SNR, and/or SINR) to the transmitting terminal. For example, when a received signal strength of the beam is less than or equal to a threshold, the receiving terminal may transmit measurement information of the beam to the transmitting terminal. The beam measurement information may be transmitted to the transmitting terminal together with the HARQ response in the step S764. The transmitting terminal may receive the beam measurement information from the receiving terminal. In addition, the receiving terminal may inform the transmitting terminal of a speed and a movement direction of the receiving terminal. The speed and movement direction of the receiving terminal may be transmitted in the step S764. In other words, in the step S764, the HARQ response, beam measurement information, and speed and movement direction of the receiving terminal may be transmitted to the transmitting terminal.

The transmitting terminal may determine whether to perform a partial beam management procedure based on the HARQ response and/or beam measurement information received from the receiving terminal (S765). For example, the transmitting terminal may determine that the partial beam management procedure is to be performed when one or more of conditions defined in Table 5 below are satisfied. In response to determining that the partial beam management procedure is to be performed, the transmitting terminal may transmit information indicating that the partial beam management procedure is to be performed to the receiving terminal. In other words, when one or more of the conditions defined in Table 5 are satisfied, the transmitting terminal may declare a beam failure and may perform a BFR procedure (e.g., partial beam management procedure). Alternatively, when one or more of the conditions defined in Table 5 are not satisfied, the transmitting terminal may perform sidelink communication with the receiving terminal using the beam (e.g., beam #2) configured by the initial beam management procedure.

Alternatively, the step S765 may be performed in the receiving terminal instead of the transmitting terminal. In response to determining that the partial beam management procedure is to be performed, the receiving terminal may transmit information indicating that the partial beam management procedure is to be performed to the transmitting terminal.

TABLE 5

| | Description |
|---|---|
| Condition #1 | Number of NACKs >= threshold |
| Condition #2 | A ratio of NACKs in HARQ responses >= threshold |
| Condition #3 | Beam quality (e.g., received signal strength) <= threshold |
| Condition #4 | A preconfigured execution periodicity of the partial beam management procedure is reached |

The thresholds and execution periodicity described in Table 5 may be configured by the base station. For example, the base station may transmit an RRC message, MAC CE, or control information including the thresholds and the execution periodicity to the transmitting terminal. The thresholds and the execution periodicity may be included in the sidelink configuration information. The transmitting terminal may obtain the thresholds and the execution periodicity used to determine whether the conditions defined in Table 5 are satisfied from the base station. The partial beam management procedure may be performed as follows.

Figure 10:
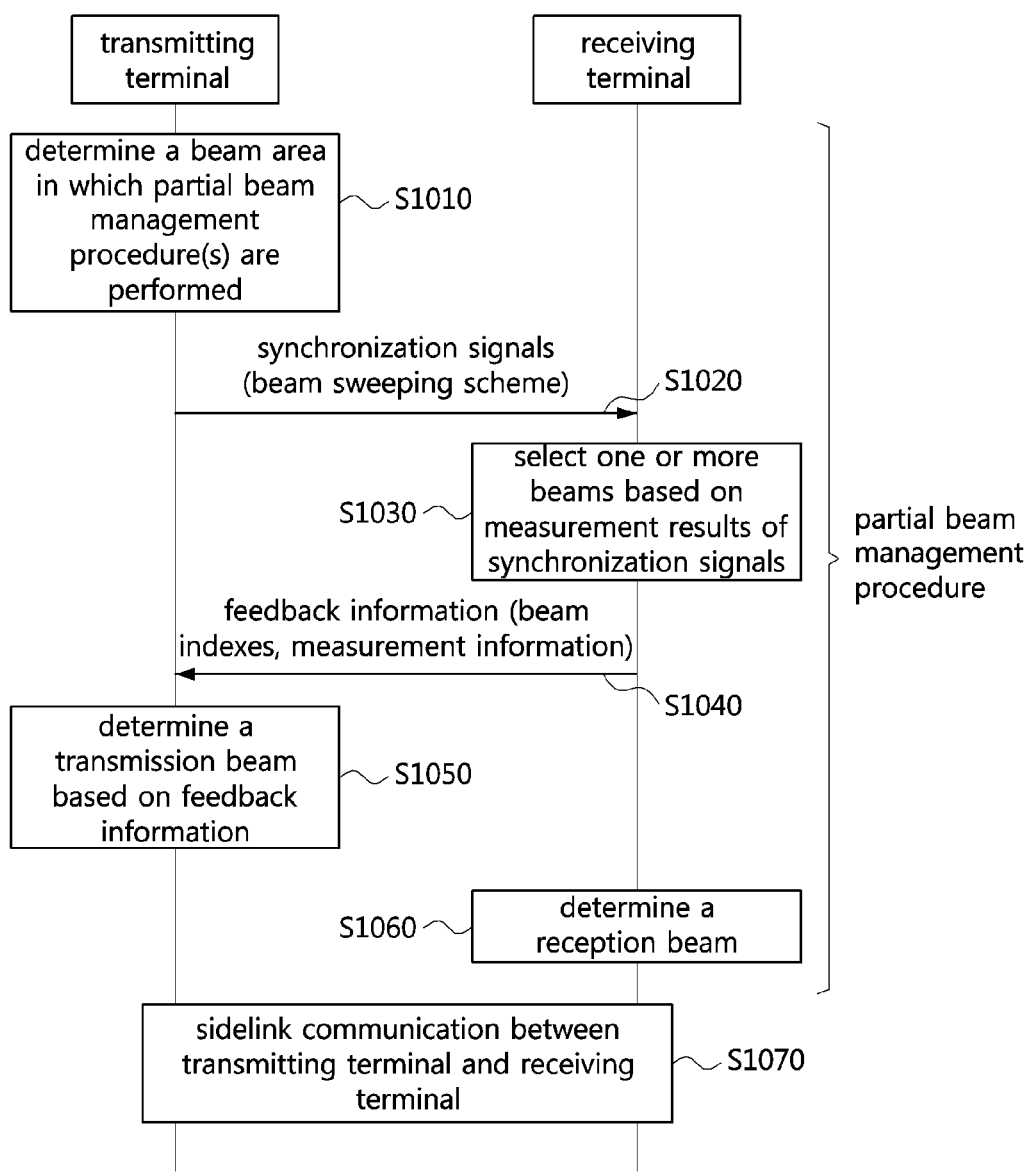
FIG. 10 is a sequence chart illustrating a second exemplary embodiment of a beam management method in a communication system.

FIG. 10 is a sequence chart illustrating a second exemplary embodiment of a beam management method in a communication system.

As shown in FIG. 10, the transmitting terminal may determine a beam area in which the partial beam management procedure is performed based on the partial beam management configuration information (e.g., information elements defined in Table 4) (S1010). The beam area may include one or more beams, and the one or more beams included in the beam area may be transmitted in a specific direction instead of all directions. The beam range included in the beam configuration information defined in Table 4 may indicate the number of beams from the transmission beam (e.g., beam #2) determined in the initial beam management procedure to a boundary of the beam area. The beam offset included in the beam configuration information defined in Table 4 may be a shift value of the beam area. When the transmission beam determined in the initial beam management procedure is the beam #2 (i.e., beam #2 shown in FIG. 8), the beam area may be determined as shown in Table 6 below.

TABLE 6

|  | Case #1 | Case #2 | Case #3 | Case #4 | Case #5 |
| --- | --- | --- | --- | --- | --- |
| Beam range | 1 | 2 | 2 | 2 | 3 |
| Beam offset | 0 | 0 | −1 | +1 | 0 |
| Beam area | Beams #1-3 | Beam #12, Beams #1-4 | Beams #1-5 | Beams #11-12, Beams #1-3 | Beams #11-12, Beams #1-5 |

The beam offset may be determined as a specific value (e.g., −1, 0, or +1) by the base station. Alternatively, the beam offset included in the partial beam management configuration information may be a set of usable beam offset values (e.g., −2, −1, 0, +1, +2). Particularly, each of the transmitting terminal and the receiving terminal may determine one beam offset value based on the speed and/or movement direction of the receiving terminal. For example, the size of the beam offset (e.g., 0, 1, or 2) may be determined based on the speed of the receiving terminal, and the sign of the beam offset (e.g., + or −) may be determined based on the movement direction of the receiving terminal.

For example, when the speed of the receiving terminal is less than a first threshold and the movement direction of the receiving terminal is a direction A, the beam offset may be determined as −1. When the speed of the receiving terminal is less than the first threshold and the movement direction of the receiving terminal is a direction B, the beam offset may be determined as +1. When the speed of the receiving terminal is greater than or equal to the first threshold and the movement direction of the receiving terminal is in direction A, the beam offset may be determined as −2. When the speed of the receiving terminal is greater than or equal to the first threshold and the movement direction of the receiving terminal is in the direction B, the beam offset may be determined as +2.

Since the transmitting terminal and the receiving terminal know the beam range, the beam offset, and the transmission beam determined in the initial beam management procedure, the beam area determined by the transmitting terminal may be the same as a beam area determined by the receiving terminal.

Alternatively, in the step S1010, the transmitting terminal may determine the beam area without consideration of information received from the base station (e.g., partial beam management configuration information). In particular, the transmitting terminal may determine the beam area based on information on the receiving terminal (e.g., speed, movement direction) and the transmission beam determined in the initial beam management procedure, and may inform the terminal of the determined beam area. The beam area determined by the transmitting terminal may include beams having a quality equal to or higher than a preconfigured threshold.

The beam areas according to the cases defined in Table 6 may be as follows.

Figure 11A:
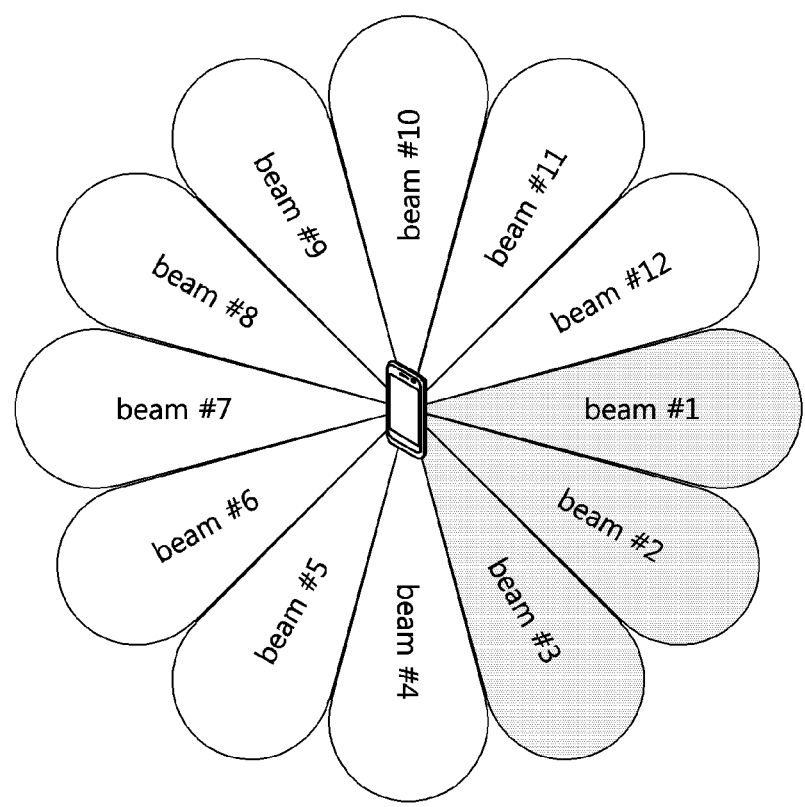
FIG. 11A is a conceptual diagram illustrating a beam area according to Case #1.
Figure 11B:
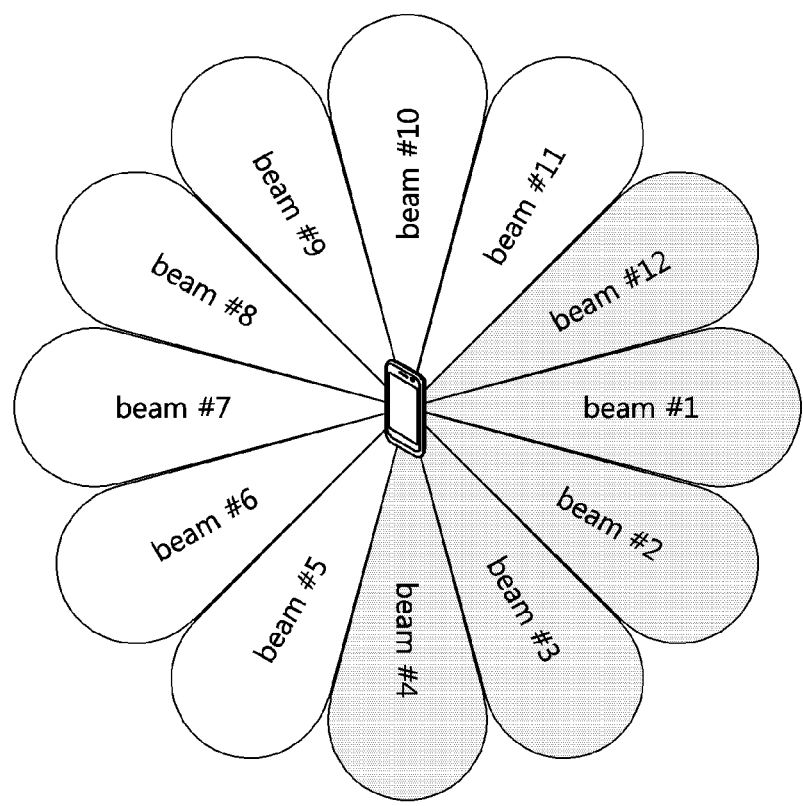
FIG. 11B is a conceptual diagram illustrating a beam area according to Case #2.
Figure 11C:
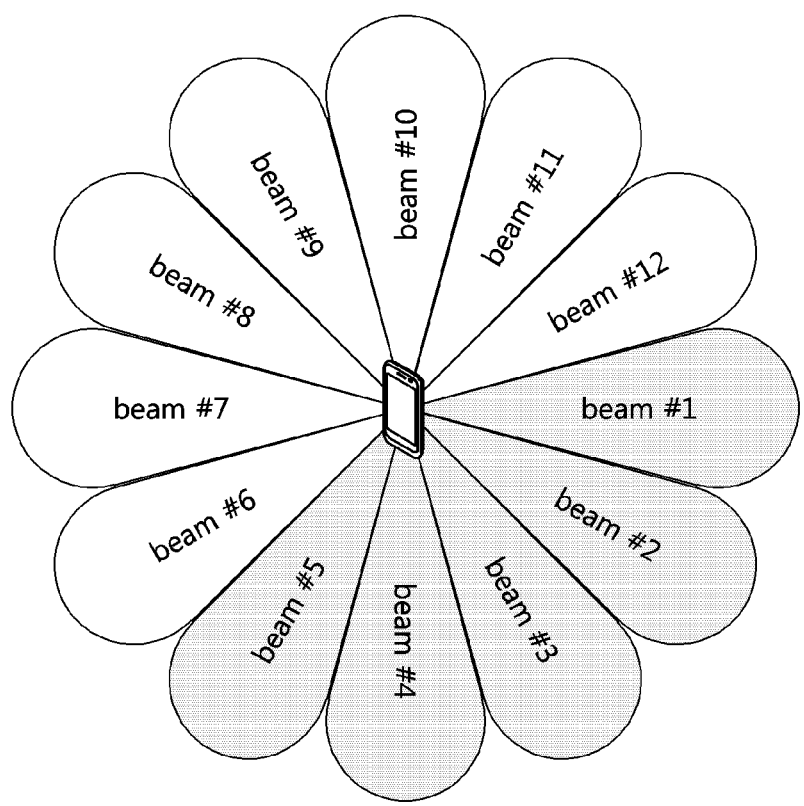
FIG. 11C is a conceptual diagram illustrating a beam area according to Case #3.
Figure 11D:
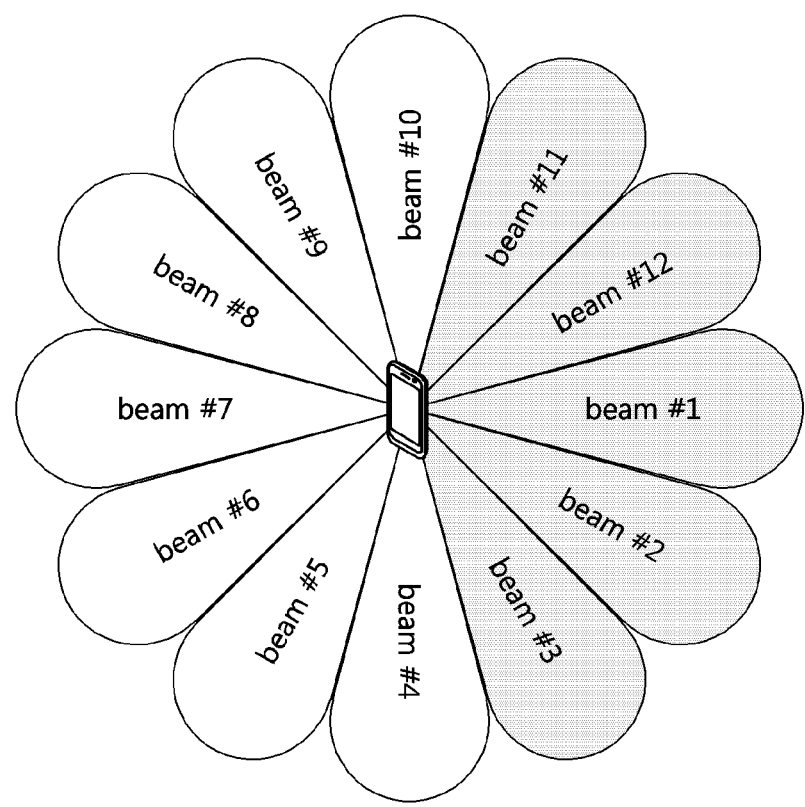
FIG. 11D is a conceptual diagram illustrating a beam area according to Case #4.
Figure 11E:
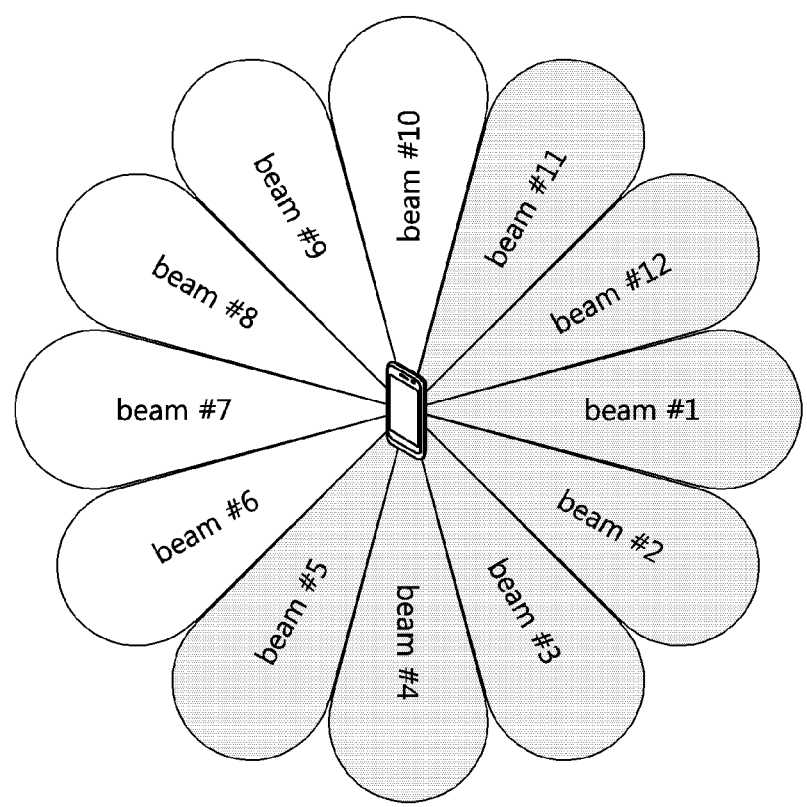
FIG. 11E is a conceptual diagram illustrating a beam area according to Case #5.

FIG. 11A is a conceptual diagram illustrating a beam area according to Case #1, FIG. 11B is a conceptual diagram illustrating a beam area according to Case #2, FIG. 11C is a conceptual diagram illustrating a beam area according to Case #3, FIG. 11D is a conceptual diagram illustrating a beam area according to Case #4, and FIG. 11E is a conceptual diagram illustrating a beam area according to Case #5.

In the exemplary embodiment shown in FIG. 11A, the beam area may include the beam #1, beam #2, and beam #3. The partial beam management procedure may be performed using the beam #1, beam #2, and beam #3 belonging to the beam area. In other words, the transmitting terminal may transmit synchronization signals in a beam sweeping scheme using the beam #1, beam #2, and beam #3. In the exemplary embodiment shown in FIG. 11B, the beam area may include the beam #12, beam #1, beam #2, beam #3, and beam #4. The partial beam management procedure may be performed using the beam #12, beam #1, beam #2, beam #3, and beam #4 belonging to the beam area. In other words, the transmitting terminal may transmit synchronization signals in a beam sweeping scheme using the beam #12, beam #1, beam #2, beam #3, and beam #4.

In the exemplary embodiment shown in FIG. 11C, the beam area may include the beam #1, beam #2, beam #3, beam #4, and beam #5. The partial beam management procedure may be performed using the beam #1, beam #2, beam #3, beam #4, and beam #5 belonging to the beam area. The transmitting terminal may transmit synchronization signals in a beam sweeping scheme using the beam #1, beam #2, beam #3, beam #4, and beam #5. In the exemplary embodiment shown in FIG. 11D, the beam area may include the beam #11, beam #12, beam #1, beam #2, and beam #3. The partial beam management procedure may be performed using the beam #11, beam #12, beam #1, beam #2, and beam #3 belonging to the beam area. In other words, the transmitting terminal may transmit synchronization signals in a beam sweeping scheme using the beam #11, beam #12, beam #1, beam #2, and beam #3.

In the exemplary embodiment shown in FIG. 11E, the beam area may include the beam #11, beam #12, beam #1, beam #2, beam #3, beam #4, and beam #5. The partial beam management procedure may be performed using the beam #11, beam #12, beam #1, beam #2, beam #3, beam #4, and beam #5 belonging to the beam area. In other words, the transmitting terminal may transmit synchronization signals in a beam sweeping scheme using the beam #11, beam #12, beam #1, beam #2, beam #3, beam #4, and beam #5.

Referring again to FIG. 10, the transmitting terminal may transmit synchronization signals within the beam area determined in the step S1010 according to the beam sweeping scheme (S1020). The synchronization signals may be transmitted using radio resources (e.g., time period, frequency band) indicated by the partial beam management configuration information, and the partial beam management procedure may be repeatedly performed as many times as the number of repetitions indicated by the partial beam management configuration information. Alternatively, information indicating the radio resources in which the partial beam management procedure is performed and/or information on the number of repetitions of the partial beam management procedure may be transmitted from the transmitting terminal to the receiving terminal before performing the step S1020. In the step S1020, other sidelink signals and/or channels may be used instead of the synchronization signals, and information required for sidelink communication as well as the synchronization signals may be transmitted.

The receiving terminal may receive synchronization signals by performing a monitoring operation on the radio resources indicated by the partial beam management configuration information (e.g., time period, frequency band) or the radio resources indicated by information obtained from the transmitting terminal. Since the receiving terminal knows the beam area in which the partial beam management configuration procedure is performed, it may perform a monitoring operation on one or more beams belonging to the beam area instead of all the beams of the transmitting terminal.

The receiving terminal may measure reception strengths of the synchronization signals, and select one or more beams (e.g., transmission beams of the transmitting terminal) through which one or more synchronization signals having a good reception strength (e.g., reception quality) are received (S1030). For example, the receiving terminal may select beams associated with synchronization signals having a reception strength equal to or greater than a threshold (e.g., threshold indicated by the partial beam management configuration information). The number of beams selected in the step S1030 may be indicated by the partial beam management configuration information. In addition, the receiving terminal may identify beam index(es) associated with the synchronization signal(s) based on the resources in which the synchronization signal(s) are received and/or information included in the synchronization signal(s).

The receiving terminal may generate feedback information including indexes of the one or more beams selected in the step S1030. The feedback information may include not only the beam indexes, but also measurement information (e.g., CSI, CQI, RSRP, RSRQ, SNR, and/or SINR) of the synchronization signal(s) received through the corresponding beam(s). The receiving terminal may transmit the feedback information to the transmitting terminal (S1040). The feedback information may be transmitted using radio resources indicated by the initial beam management configuration information.

The transmitting terminal may receive the feedback information (e.g., beam index(es) and/or measurement information) from the receiving terminal by performing a monitoring operation on the feedback resources indicated by the initial beam management configuration information. The transmitting terminal may determine a final transmission beam of the transmitting terminal based on the feedback information (S1050). For example, when the feedback information includes one beam index (e.g., index of a beam associated with a synchronization signal having the best reception quality), the transmitting terminal may determine the beam indicated by the feedback information as the final transmission beam of the transmitting terminal. When the feedback information includes a plurality of beam indexes, the transmitting terminal may determine a beam having the best reception quality (e.g., received signal strength) among a plurality of beams corresponding to the plurality of beam indexes as the final transmission beam of the transmitting terminal. The transmitting terminal may inform the receiving terminal of information (e.g., beam index) of the final transmission beam.

In addition, the receiving terminal may determine a reception beam (e.g., receiving direction) of the receiving terminal based on sidelink signals and/or channels received from the transmitting terminal (S1060). The receiving terminal may inform the transmitting terminal of the reception beam determined in the step S1060. A beam pair (e.g., transmission beam-reception beam) may be reconfigured between the transmitting terminal and the receiving terminal by the partial beam management procedure (e.g., steps S1010 to S1060). Sidelink communication between the transmitting terminal and the receiving terminal may be performed using the beam pair configured by the partial beam management procedure (S1070). The step S1070 may be performed identically or similarly to the step S960 shown in FIG. 7.

Meanwhile, when a beam pair between the transmitting terminal and the receiving terminal is not configured by the partial beam management procedure, the partial beam management procedure may be repeatedly performed. For example, when a beam pair is not configured in a first partial beam management procedure, a second partial beam management procedure may be performed after the first partial beam management procedure. A beam area in which the second partial beam management procedure is performed may be greater than a beam area in which the first partial beam management procedure is performed. A difference value between the beam areas in the partial beam management procedures repeatedly performed may be included in the partial beam management configuration information. For example, when the beam range is 1 and the difference value between the beam areas is 1, the beam area in which the second partial beam management procedure is performed may be determined based on a 'beam range 2 (1+1)'.

In addition, the beam area in which the second partial beam management procedure is performed may be shifted compared to the beam area in which the first partial beam management procedure is performed. The beam area in which the second partial beam management procedure is performed may be shifted in a direction of a beam having a good reception quality among beams measured in the first partial beam management procedure. For example, when the beam area in which the first partial beam management procedure is performed includes the beams #1 to #3, and the beam #3 among the beams #1 to #3 has the best reception quality, the beam area in which the second partial beam management procedure is performed may be determined to include the beams #2 to #4. In particular, since the transmitting terminal and the receiving terminal know the beam having the best reception quality among the beams #1 to #3, the beam area for the second partial beam management procedure determined by the transmitting terminal may be the same as a beam area for the second partial beam management procedure determined by the receiving terminal.

In other words, the size of the beam area for the second partial beam management procedure (hereinafter, referred to as 'second beam area') may be different from that of the beam area for the first partial beam management procedure (hereinafter referred to as 'first beam area'). Alternatively, the second beam area may be shifted relative to the first beam area. Alternatively, the size of the second beam area may be different from the size of the first beam area, and further, the second beam area may be shifted compared to the first beam area.

The partial beam management procedure may be repeatedly performed as many times as the number of repetitions indicated by the partial beam management configuration information. A beam pair between the transmitting terminal and the receiving terminal may not be configured even while the partial beam management procedure is performed as many times as the number of repetitions indicated by the partial beam management configuration information. In particular, each of the transmitting terminal and the receiving terminal may determine that the partial beam management procedure has failed, and may perform the initial beam management procedure (e.g., steps S710 to S750 shown in FIG. 7) again.

Sidelink communication based on the above-described beam management procedures may be performed as follows.

Figure 12:
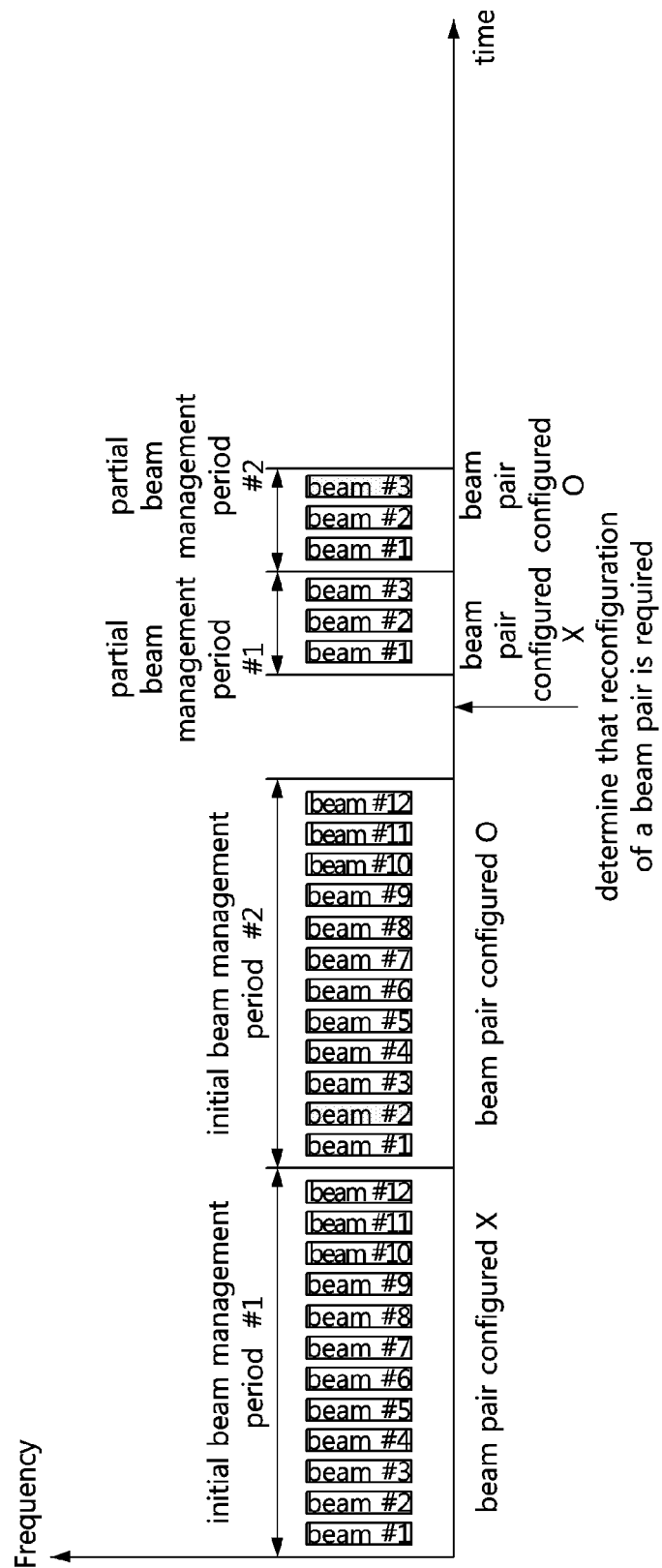
FIG. 12 is a timing diagram illustrating a first exemplary embodiment of a sidelink communication method based on a beam management procedure in a communication system.

FIG. 12 is a timing diagram illustrating a first exemplary embodiment of a sidelink communication method based on a beam management procedure in a communication system.

As shown in FIG. 12, the initial beam management procedure may be performed in an initial beam management period, and the partial beam management procedure may be performed in a partial beam management period. The entire initial beam management period may include a plurality of initial beam management periods (e.g., initial beam management periods #1 and #2), and the initial beam management procedure may be repeatedly performed in the entire initial beam management period. The entire partial beam management period may include a plurality of partial beam management periods (e.g., partial beam management periods #1 and #2), and the partial beam management procedure may be repeatedly performed in the entire partial beam management period.

The transmitting terminal and the receiving terminal may perform the initial beam management procedure. The transmitting terminal may transmit synchronization signals in all directions using 12 beams (e.g., beams #1 to #12 shown in FIG. 8) in the initial beam management period #1. In particular, other sidelink signals and/or channels may be transmitted instead of the synchronization signals. When a beam pair between the transmitting terminal and the receiving terminal is not configured in the initial beam management period #1, the transmitting terminal may transmit synchronization signals in all directions using 12 beams in the initial beam management period #2. The initial beam management procedure may be repeatedly performed within a preconfigured number of repetitions until a beam pair between the transmitting terminal and the receiving terminal is configured.

The receiving terminal may receive synchronization signals from the transmitting terminal in the initial beam management period #2, and may inform the transmitting terminal of one or more beam indexes associated with one or more synchronization signals having a good reception quality. When a synchronization signal having the best reception quality is transmitted through the beam #2, a transmission beam of the transmitting terminal may be determined as the beam #2. In addition, the receiving terminal may determine a reception beam (e.g., receiving direction) of the receiving terminal based on sidelink signals and/or channels received from the transmitting terminal.

A beam pair between the transmitting terminal and the receiving terminal may be configured by the initial beam management procedure performed in the initial beam management period #2. In particular, sidelink communication between the transmitting terminal and the receiving terminal may be performed using the beam pair configured by the initial beam management procedure.

Meanwhile, in response to determining that it is required to perform a partial beam management procedure in the step S765 shown in FIG. 9, the transmitting terminal and the receiving terminal may perform the partial beam management procedure. The transmitting terminal may transmit synchronization signals using beams belonging to a beam area (e.g., beams #1 to #3 shown in FIG. 8) in the partial beam management period #1. In particular, other sidelink signals and/or channels may be transmitted instead of the synchronization signals. When a beam pair between the transmitting terminal and the receiving terminal is not configured in the partial beam management period #1, the transmitting terminal may transmit synchronization signals using beams belonging to a beam area in the partial beam management period #2.

The beam area in the partial beam management period #2 (hereinafter referred to as 'beam area 2') may be larger than the beam area (hereinafter referred to as 'beam area 1') in the partial beam management period #1. For example, if the beam area 1 includes the beam #1, beam #2, and beam #3, the beam area 2 may include the beam #12, beam #1, beam #2, beam #3, and beam #4. Alternatively, the beam area 2 may be shifted relative to the beam area 1. For example, when the beam area 1 includes the beam #1, beam #2, and beam #3, the beam area 2 may include the beam #2, beam #3, and beam #4. Alternatively, the beam area 2 shifted relative to the beam area 1 may be greater than the beam area 1. For example, if the beam area 1 includes the beam #1, beam #2, and beam #3, the beam area 2 may include the beam #1, beam #2, beam #3, beam #4, and beam #5.

The partial beam management procedure may be repeatedly performed until a beam pair between the transmitting terminal and the receiving terminal is configured within a preconfigured number of repetitions. The receiving terminal may receive synchronization signals from the transmitting terminal in the partial beam management period #2, and may inform the transmitting terminal of one or more beam indexes associated with one or more synchronization signals having a good reception quality. When a synchronization signal having the best reception quality is transmitted through the beam #3, a transmission beam of the transmitting terminal may be determined as the beam #3. In addition, the receiving terminal may determine a reception beam (e.g., receiving direction) of the receiving terminal based on sidelink signals and/or channels received from the transmitting terminal.

A beam pair between the transmitting terminal and the receiving terminal may be determined by the partial beam management procedure performed in the partial beam management period #2. In particular, sidelink communication between the transmitting terminal and the receiving terminal may be performed using the beam pair determined by the partial beam management procedure.

Figure 13:
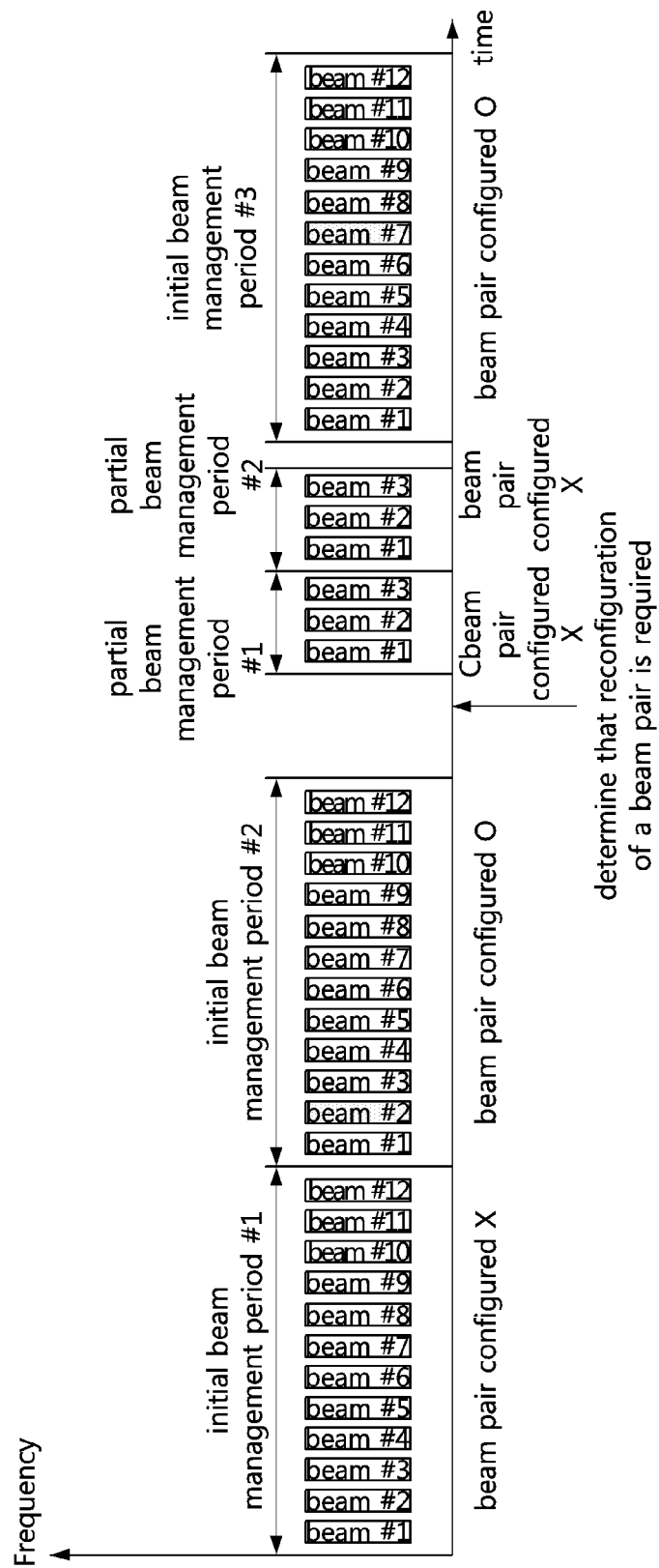
FIG. 13 is a timing diagram illustrating a second exemplary embodiment of a sidelink communication method based on a beam management procedure in a communication system.

FIG. 13 is a timing diagram illustrating a second exemplary embodiment of a sidelink communication method based on a beam management procedure in a communication system.

As shown in FIG. 13, the initial beam management procedure may be performed in an initial beam management period, and the partial beam management procedure may be performed in a partial beam management period. The entire initial beam management period may include a plurality of initial beam management periods (e.g., initial beam management periods #1 to #3), and the initial beam management procedure may be repeatedly performed in the entire initial beam management period. The entire partial beam management period may include a plurality of partial beam management periods (e.g., partial beam management periods #1 and #2), and the partial beam management procedure may be repeatedly performed in the entire partial beam management period.

The transmitting terminal and the receiving terminal may perform the initial beam management procedure. The transmitting terminal may transmit synchronization signals in all directions using 12 beams (e.g., beams #1 to #12 shown in FIG. 8) in the initial beam management period #1. In particular, other sidelink signals and/or channels may be transmitted instead of the synchronization signals. When a beam pair between the transmitting terminal and the receiving terminal is not configured in the initial beam management period #1, the transmitting terminal may transmit synchronization signals in all directions using 12 beams in the initial beam management period #2. The initial beam management procedure may be repeatedly performed within a preconfigured number of repetitions until a beam pair between the transmitting terminal and the receiving terminal is configured.

The receiving terminal may receive synchronization signals from the transmitting terminal in the initial beam management period #2, and may inform the transmitting terminal of one or more beam indexes associated with one or more synchronization signals having a good reception quality. When a synchronization signal having the best reception quality is transmitted through the beam #2, a transmission beam of the transmitting terminal may be determined as the beam #2. In addition, the receiving terminal may determine a reception beam (e.g., receiving direction) of the receiving terminal based on sidelink signals and/or channels received from the transmitting terminal.

A beam pair between the transmitting terminal and the receiving terminal may be determined by the initial beam management procedure performed in the initial beam management period #2. In particular, sidelink communication between the transmitting terminal and the receiving terminal may be performed using the beam pair determined by the initial beam management procedure.

Meanwhile, in response to determining that it is required to perform a partial beam management procedure in the step S765 shown in FIG. 9, the transmitting terminal and the receiving terminal may perform the partial beam management procedure. The transmitting terminal may transmit synchronization signals using beams belonging to a beam area (e.g., beams #1 to #3 shown in FIG. 8) in the partial beam management period #1. Particularly, other sidelink signals and/or channels may be transmitted instead of the synchronization signals. When a beam pair between the transmitting terminal and the receiving terminal is not configured in the partial beam management period #1, the transmitting terminal may transmit synchronization signals using beams belonging to a beam area in the partial beam management period #2.

The beam area in the partial beam management period #2 (hereinafter referred to as 'beam area 2') may be greater than the beam area (hereinafter referred to as 'beam area 1') in the partial beam management period #1. For example, if the beam area 1 includes the beam #1, beam #2, and beam #3, the beam area 2 may include the beam #12, beam #1, beam #2, beam #3, and beam #4. Alternatively, the beam area 2 may be shifted relative to the beam area 1. For example, when the beam area 1 includes the beam #1, beam #2, and beam #3, the beam area 2 may include the beam #2, beam #3, and beam #4. Alternatively, the beam area 2 shifted relative to the beam area 1 may be greater than the beam area 1. For example, if the beam area 1 includes the beam #1, beam #2, and beam #3, the beam area 2 may include the beam #1, beam #2, beam #3, beam #4, and beam #5.

If a beam pair between the transmitting terminal and the receiving terminal is not configured even when the partial beam management procedure is repeatedly performed by a preconfigured repetition number, the transmitting terminal and the receiving terminal may perform the initial beam management procedure again. For example, the transmitting terminal may transmit synchronization signals in all directions using 12 beams in the initial beam management period #3.

The receiving terminal may receive synchronization signals from the transmitting terminal in the initial beam management period #3, and may inform the transmitting terminal of one or more beam indexes associated with one or more synchronization signals having a good reception quality. When a synchronization signal having the best reception quality is transmitted through the beam #7, a transmission beam of the transmitting terminal may be determined as the beam #7. In addition, the receiving terminal may determine a reception beam (e.g., receiving direction) of the receiving terminal based on sidelink signals and/or channels received from the transmitting terminal.

A beam pair between the transmitting terminal and the receiving terminal may be determined by the initial beam management procedure performed in the initial beam management period #3. In particular, sidelink communication between the transmitting terminal and the receiving terminal may be performed using the beam pair determined by the initial beam management procedure.

Meanwhile, although it has been described that the partial beam management procedure is performed after the initial beam management procedure in the above-described exemplary embodiments, the partial beam management procedure may be performed independently of the initial beam management procedure. In other words, the transmitting terminal and the receiving terminal may perform the initial beam management procedure or the partial beam management procedure. The type of the beam management procedure (e.g., initial beam management procedure or partial beam management procedure) performed for sidelink communication may be determined by at least one of the base station, the transmitting terminal, and the receiving terminal.

When the partial beam management procedure is independently performed, the transmitting terminal may determine a beam area in which the partial beam management procedure is performed. The beam area may be determined based on information received from the receiving terminal (e.g., position information (e.g., a zone in which the receiving terminal is located), speed, and movement direction). The beams included in the beam area may be a portion of all beams of the transmitting terminal. The transmitting terminal may inform the receiving terminal of the determined beam area. For example, the beam area may be informed to the receiving terminal through a MAC CE and/or SCI.

The transmitting terminal may transmit synchronization signals to the receiving terminal using the beams belonging to the beam area. The receiving terminal may receive synchronization signals from the base station by performing a monitoring operation on the beam area. The receiving terminal may inform the transmitting terminal of one or more beam indexes associated with one or more synchronization signals having a good reception quality. When a synchronization signal having the best reception quality is transmitted through the beam #2, a transmission beam of the transmitting terminal may be determined as the beam #2. In addition, the receiving terminal may determine a reception beam (e.g., receiving direction) of the receiving terminal based on sidelink signals and/or channels received from the transmitting terminal. A beam pair between the transmitting terminal and the receiving terminal may be determined by the partial beam management procedure performed independently of the initial beam management procedure.

In addition, the partial beam management procedure may be repeatedly performed. When a beam pair between the transmitting terminal and the receiving terminal is not configured in a first partial beam management procedure, a second partial beam management procedure may be performed after the first partial beam management procedure. A beam area (hereinafter, referred to as 'beam area 2') in the second partial beam management procedure may be larger than the beam area (hereinafter, referred to as 'beam area 1') in the first partial beam management procedure. Alternatively, the beam area 2 may be shifted relative to the beam area 1. Alternatively, the beam area 2 shifted relative to the beam area 1 may be larger than the beam area 1.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a first terminal in a communication system, the operation method comprising:
   transmitting first sidelink signals in all directions using a beam sweeping scheme in an initial beam management period;
   receiving first feedback information for the first sidelink signals from a second terminal;
   configuring a first beam pair between the first terminal and the second terminal based on the first feedback information;
   performing sidelink communication with the second terminal using the first beam pair;
   in response to determining that reconfiguration of the first beam pair is required, transmitting second sidelink signals in a specific direction instead of all directions using a beam sweeping scheme in a partial beam management period; and
   transmitting third sidelink signals in all directions using a beam sweeping scheme when the first beam pair is not reconfigured within the partial beam management period.

2. The operation method according to claim 1, further comprising:
   receiving second feedback information for the second sidelink signals from the second terminal;
   configuring a second beam pair between the first terminal and the second terminal based on the second feedback information; and
   performing the sidelink communication with the second terminal using the second beam pair.

3. The operation method according to claim 1, wherein an initial beam management procedure is performed within the initial beam management period, a partial beam management procedure is performed within the partial beam management period, and configuration information for the initial beam management procedure and configuration information for the partial beam management procedure are received from a base station.

4. The operation method according to claim 1, wherein when a beam failure is declared between the first terminal and the second terminal, a partial beam management procedure is performed within the partial beam management period, and the beam failure is declared based on at least one of a hybrid automatic repeat request (HARQ) response and beam measurement information received from the second terminal.

5. The operation method according to claim 1, wherein the specific direction is a direction of transmitting beams belonging to a beam area, and the beams belonging to the beam area are determined based on a transmission beam of the first terminal in the first beam pair.

6. The operation method according to claim 5, wherein the beams belonging to the beam area include the transmission beam and n beams adjacent to the transmission beam, and n is a natural number.

7. The operation method according to claim 5, wherein a number of the beams belonging to the beam area is configured by the base station.

8. The operation method according to claim 5, wherein a center beam among the beams belonging to the beam area is a beam spaced apart from the transmission beam by m, and m is a natural number.

9. The operation method according to claim 8, wherein m is determined based on a speed of the second terminal, and a separation direction from the transmission beam to the center beam is determined based on a movement direction of the second terminal.

10. The operation method according to claim 1, wherein a partial beam management procedure is repeatedly performed within the partial beam management period, and a first beam area corresponding to a specific direction in which the second sidelink signals are transmitted in a first partial beam management procedure is different from a second beam area corresponding to a specific direction in which the second sidelink signals are transmitted in a second partial beam management procedure after the first partial beam management procedure.

11. The operation method according to claim 10, wherein the second beam area is larger than the first beam area, or the second beam area is shifted relative to the first beam area.

12. The operation method according to claim 1, wherein each of the first sidelink signal and the second sidelink signal is a synchronization signal or a reference signal.

13. An operation method of a second terminal in a communication system, comprising:
- receiving first sidelink signals from a first terminal in an initial beam management period;
- transmitting first feedback information for the first sidelink signals to the first terminal;
- performing sidelink communication with the first terminal using a first beam pair between the first terminal and the second terminal, the first beam pair being determined based on the first feedback information;
- in response to determining that reconfiguration of the first beam pair is required, receiving second sidelink signals from the first terminal in a partial beam management period; and
- receiving, from the first terminal, third sidelink signals in all directions when the first beam pair is not reconfigured within the partial beam management period,
- wherein the first sidelink signals are transmitted in all directions in the initial beam management period, and the second sidelink signals are transmitted in a specific direction instead of all directions in the partial beam management period.

14. The operation method according to claim 13, further comprising:
- transmitting second feedback information for the second sidelink signals to the first terminal; and
- performing the sidelink communication with the first terminal using a second beam pair between the first terminal and the second terminal, the second beam pair being determined based on the second feedback information.

15. The operation method according to claim 13, wherein the specific direction is a direction of transmitting beams belonging to a beam area, and the beams belonging to the beam area are determined based on a transmission beam of the first terminal in the first beam pair.

16. The operation method according to claim 15, wherein the beams belonging to the beam area include the transmission beam and n beams adjacent to the transmission beam, and n is a natural number.

17. The operation method according to claim 15, wherein a center beam among the beams belonging to the beam area is a beam spaced apart from the transmission beam by m, and m is a natural number.

18. The operation method according to claim 13, wherein a partial beam management procedure is repeatedly performed within the partial beam management period, and a first beam area corresponding to a specific direction in which the second sidelink signals are transmitted in a first partial beam management procedure is different from a second beam area corresponding to a specific direction in which the second sidelink signals are transmitted in a second partial beam management procedure after the first partial beam management procedure.

19. The operation method according to claim 18, wherein the second beam area is larger than the first beam area, or the second beam area is shifted relative to the first beam area.

* * * * *